United States Patent [19]

Dyer

[11] Patent Number: 5,496,056
[45] Date of Patent: Mar. 5, 1996

[54] AUTOMOTIVE PASSENGER AIR BAG MODULE CUSHION FOLD

[75] Inventor: David J. Dyer, Kaysville, Utah

[73] Assignee: Morton International, Inc., Chicago, Ill.

[21] Appl. No.: 391,891

[22] Filed: Feb. 21, 1995

[51] Int. Cl.⁶ .................................................. B60R 21/20
[52] U.S. Cl. ...................................... 280/728.1; 280/743.1
[58] Field of Search ........................... 280/743.1, 728.1, 280/730.1, 732, 731, 742, 728.2

[56] References Cited

U.S. PATENT DOCUMENTS

| | | | |
|---|---|---|---|
| 4,351,544 | 9/1982 | Ross | 280/743.1 |
| 5,022,675 | 6/1991 | Zelenak, Jr. et al. | 280/743.1 |
| 5,140,799 | 8/1992 | Satoh | 280/743.1 |
| 5,178,407 | 1/1993 | Kelley | 280/743.1 |
| 5,240,282 | 8/1993 | Wehner et al. | 280/743.1 |
| 5,290,061 | 3/1994 | Bollaert | 280/743.1 |
| 5,348,341 | 9/1994 | Webber | 280/743.1 |
| 5,378,019 | 1/1995 | Smith et al. | 280/743.1 |
| 5,382,048 | 1/1995 | Paxton et al. | 280/728.1 |

FOREIGN PATENT DOCUMENTS

| | | | |
|---|---|---|---|
| 5-65047 | 3/1993 | Japan | 280/743.1 |

Primary Examiner—Margaret A. Focarino
Assistant Examiner—Peter C. English
Attorney, Agent, or Firm—Gerald K. White

[57] ABSTRACT

A fold configuration of top mounted air bag cushions which tend to deploy high in a vehicle compartment and slap the face of an occupant uses several fold variations including a loop of fabric on top, folded side wing panels, a roll comprising a plurality of folds, and an upper pleat and a pleat producing tuck which inversely roll down the vehicle dashboard when an inflating fluid under pressure from an inflator flows into the cushion, which folds can only unfold in sequence one after another so that expansion of the cushion is stopped at a predetermined extended length which creates an initial gas-fill cavity that overpressurizes taking additional energy to unfurl the remaining cushion, which slows the deployment, with the side wing panels folded toward the bottom of the cushion so that the side wing panels, when inflated, deploy low into the occupant's lap.

11 Claims, 5 Drawing Sheets

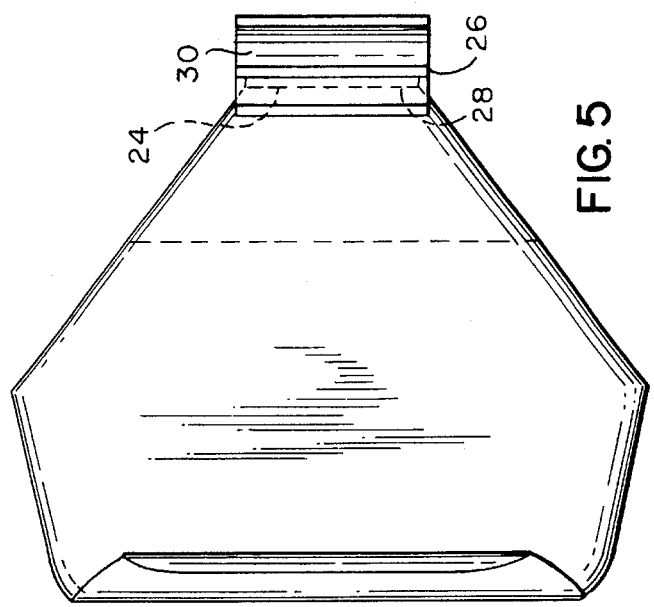
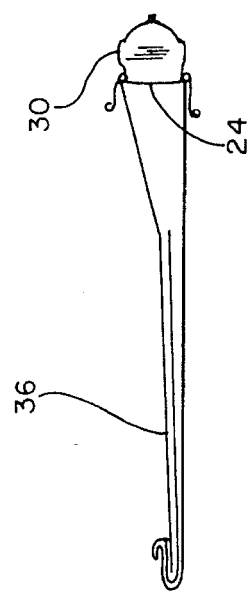
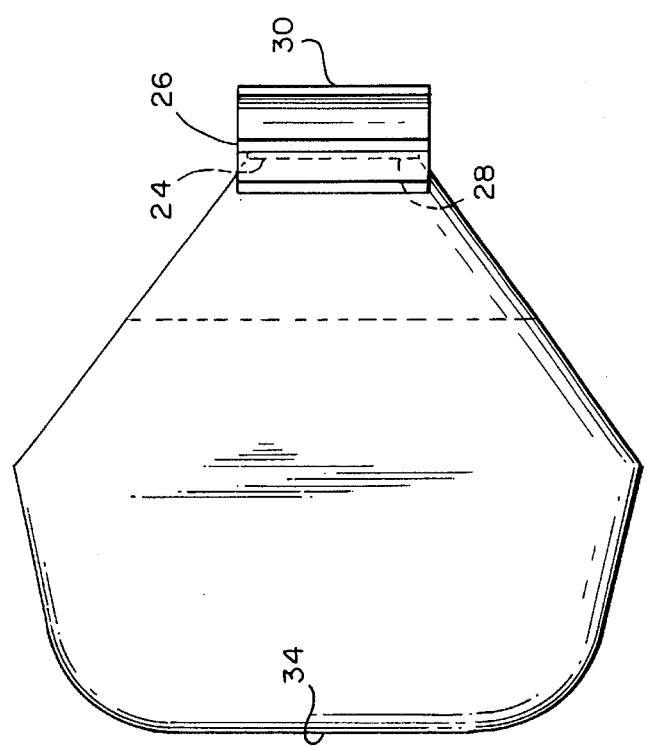
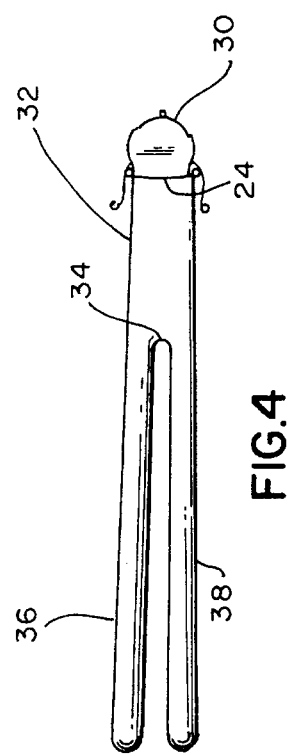

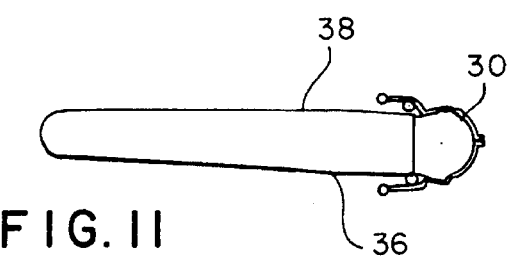
FIG. 11
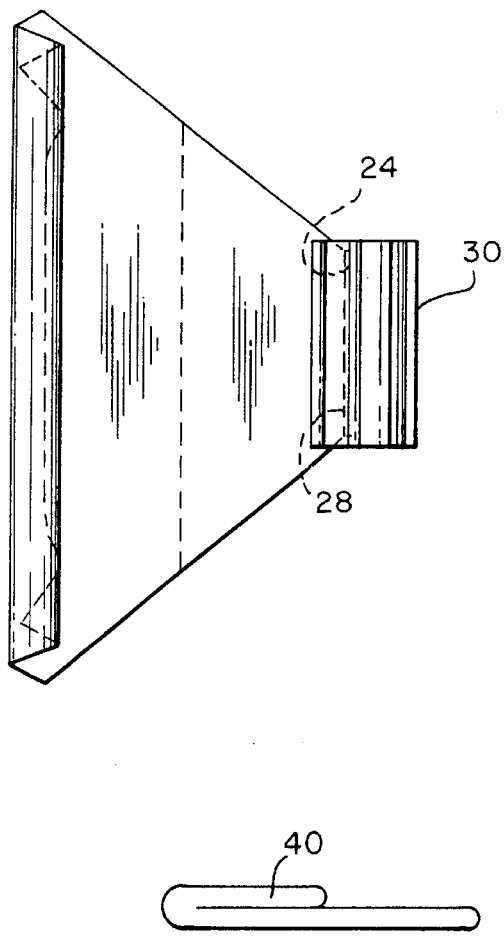
FIG. 7
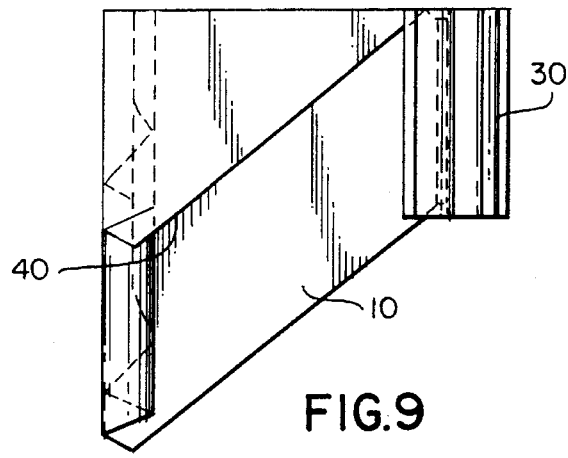
FIG. 9
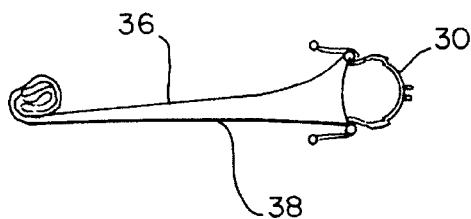
FIG. 12
FIG. 8
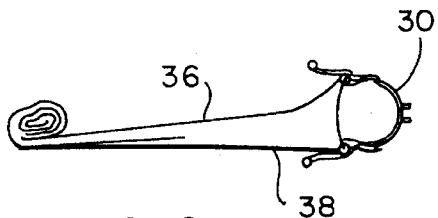
FIG. 10

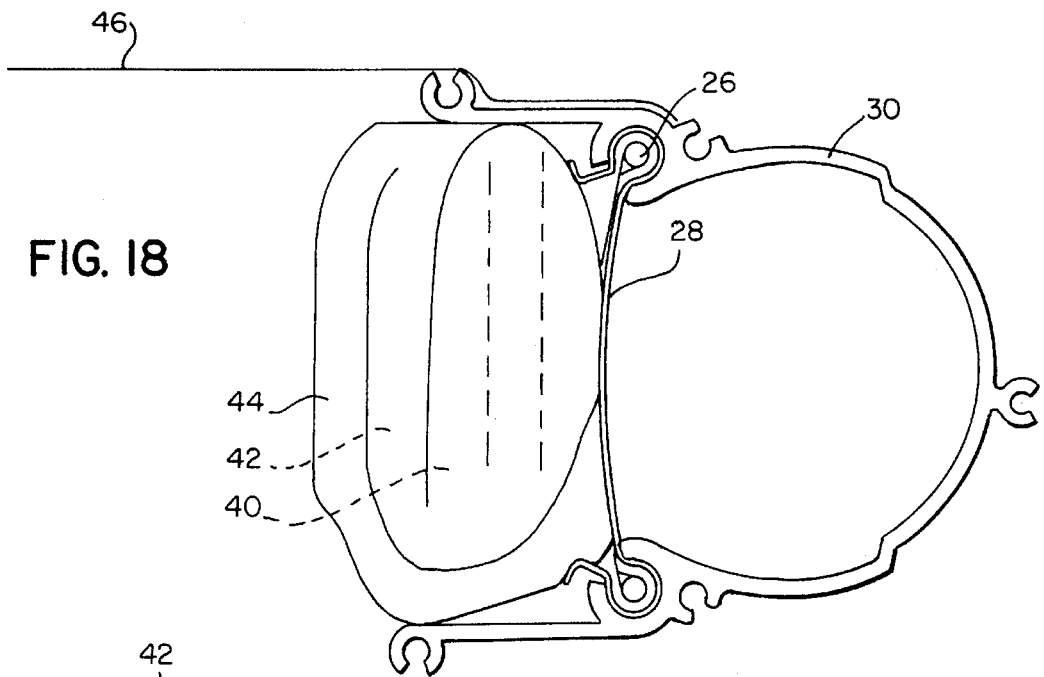
FIG. 18
FIG. 15
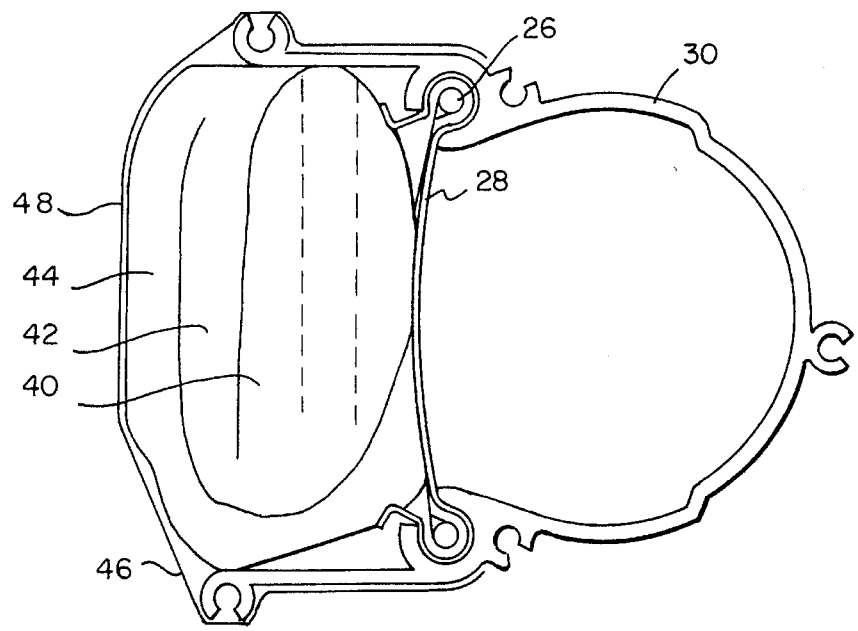
FIG. 19

AUTOMOTIVE PASSENGER AIR BAG MODULE CUSHION FOLD

BACKGROUND OF THE INVENTION

1. Field of the Invention

This invention relates to an air bag cushion which is inflatable for restraining an automotive vehicle passenger during a collision. More particularly, the invention relates to folding an air bag cushion in a manner to control the deployment thereof.

2. Description of the Prior Art

Typically, an air bag cushion is folded and supported on the steering wheel or dashboard of a vehicle. When the air bag is to be inflated, high pressure nitrogen or other suitable gas from an inflator is caused to flow therein through a gas inlet opening or mouth that is provided. This causes the air bag to unfold and inflate.

Upon vehicle impact in a collision, top mounted air bag cushions, that is, those mounted near the top of the dashboard, tend to deploy high in the vehicle compartment and tend also to deploy with great velocity at the passenger's face. As most air bag cushions deploy, the pressure in the cushion spikes to a high pressure initially. The high pressure ejects the folded cushion out of the air bag module with great velocity. This results in the cushion slapping the face of the passenger as it unfolds. Such "slapping" of the passenger with the cushion material, particularly when the passenger is an out-of-position child, can cause skin abrasions, excessive neck extension, and increase head injury criteria values.

Thus, there is a need and a demand for reducing and/or correcting this problem so that the air bag cushion has a controlled deployment which results in reduction or elimination of "bag slap" injuries in the event of an automotive vehicle collision.

SUMMARY OF THE INVENTION

An object of the invention is to provide an improved cushion fold for top mounted passenger module restraint systems. The cushion fold is characterized by controlled deployment upon activation. The controlled deployment reduces initial bag slap to a passenger's face when the cushion is deployed.

A more specific object of the invention is to provide a method of folding an inflatable air bag cushion made of air bag fabric and having a mouth defined by a cushion retainer and diffuser of a reaction canister, comprising the steps, with the cushion initially unfolded and uninflated and positioned with the bottom facing up and the mouth at the central side position thereof:

a. tucking the center of the cushion toward the mouth to create an upper pleat and a lower pleat, b. holding about 20 millimeters of the lower and upper pleats, folding a succession of folds, each of which is about 50 millimeters long into a roll over the upper pleat until a predetermined extended air bag length of about 60% of the original length thereof is reached, c. folding one side wing panel of the cushion fabric on top of the upper pleat, d. folding the opposite side wing panel of the cushion fabric on top of the folded said one side wing panel thereof, the width of the folded cushion being about the width of the mouth of the cushion, e. inserting the roll of and side wing panel fabric of the cushion into the mouth of the cushion diffuser with the fabric of the folded side wing panels facing the cushion diffuser and with a loop of excess cushion fabric protruding, f. folding the loop of excess fabric over the fabric of the roll and side wing panels of the diffuser, and g. attaching a TYVEK nonwoven fabric to the reaction canister to retain the loop of excess fabric and the fabric of the roll and folded cushion side wing panels inserted in the mouth of the cushion diffuser.

The controlled deployment of the cushion fold is achieved by stopping the deployment of the cushion at a predetermined extended length. This creates an initial deployment gas-fill cavity. The predetermined extended length helps reduce bag slap of a passenger's face due to the excess of energy that is then needed to deploy the remainder of the folded cushion. Upon deployment, the bag will extend to the predetermined extended length, and then it takes additional energy to unfurl the remaining cushion. This slows the deployment of the cushion.

Following the creation of the initial gas-fill cavity, a continued flow of inflating gas into the cushion overpressurizes the gas-fill cavity. If the cavity is too small, the air bag can overpressurize early in the deployment (before 20 ms, for example). The initial gas-fill cavity size can be changed to conform most efficiently with the characteristics of the performance of the inflator that is used in the air bag module. A high performance inflator would require a larger initial gas-fill cavity. A lower performance inflator would not need a large initial gas-fill cavity.

In accordance with the invention, the initial gas-fill cavity is so sized in relation to the performance of the inflator employed that overpressurization of the gas-fill cavity occurs at a time that is in accord with the control of the cushion deployment that is desired. Overpressurization of the gas-fill cavity introduces a need for additional energy to unfurl the remaining cushion. That is to say, upon deployment of the cushion, the cushion will extend to the predetermined length, then it will take additional energy to unfurl the remaining cushion, which slows the deployment.

Additionally, side fabric portions or wing panels of the cushion are folded on the bottom side of the cushion. By so folding these side wing panels, they deploy low in a passenger's lap instead of in the passenger's face.

When the cushion is deployed, a loop of fabric first opens against the windshield of the vehicle, pushing the rest of the cushion fold downward. Fabric unfolds downward against the instrument panel and then side fabric portions or wing panels are pushed out. The side fabric portions or wing panels of the cushion, having been folded on toward the bottom side of the cushion, then deploy low into a passenger's lap instead of a passenger's face. This allows the rest of the cushion to unfold with the center of the fabric blossoming out and allowing the cushion to fill completely with gas.

As the cushion deployment develops, pressurized gas forced therein from an inflator pushes open each fold one after another until the cushion fully deploys. If the folds of the cushion are difficult for the inflator pressurized gas to push open, this slows the deployment of the cushion as it unfolds.

The effectiveness of the air bag cushion fold configuration of the present invention in solving the problem of high velocity deployment which increases "bag slap" injuries to vehicle occupants is demonstrated by comparing its pressure-time curve with that of other air bag cushion folds. As most cushion folds deploy, the pressure in the cushion spikes initially to a high pressure. This high pressure ejects the folded cushion out of the module with great velocity. This great velocity causes the pressure in the cushion to go negative, that is, become less than zero, because the cushion begins to unfold faster than the inflator can supply gas to fill it up. As the air bag cushion fold configuration of the present invention deploys, however, the pressure in the cushion does not usually go negative because the fold sequence does not allow the cushion to eject with a velocity great enough to cause this to happen.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying drawings which form part of the specification, of which:

FIG. 3 is a plan view of an air bag module reaction canister diffuser assembly having a width of 190 millimeters and attached to the gas-inflator mouth of an unfolded and uninflated air bag cushion having a length of about 560 millimeters and width of about 686 millimeters, which air bag cushion is laid flat so that the bottom of the cushion faces up, with a portion of the cushion tucked in toward the cushion gas inlet or mouth and creating an upper and a lower pleat;

FIG. 4 is a side view of the FIG. 3 air bag cushion showing the upper and lower pleats;

FIG. 5 and 6 are plan and side views, respectively, of the air bag shown in FIGS. 3 and 4 with 20 millimeters of the lower and upper pleat folded counter clockwise and 50 millimeters of the upper and lower pleats folded clockwise on top of the upper pleat, as shown;

FIGS. 7 and 8 are views similar to FIGS. 5 and 6 but showing a continued clockwise roll of the upper and lower pleats for 50 millimeters until, as shown, an extended bag length of about 350 millimeters is reached;

FIGS. 9, 10, 11 and 12 show the side panel portions or wing panels on one side of the cushion folded on top of the upper pleat, that is, toward the bottom side of the cushion;

FIGS. 13, 14 and 15 show the side panel portions or wing panels on the other side of the cushion also folded toward the bottom side of the cushion;

FIG. 18 shows the loop of excess cushion fabric folded over the roll top of the roll/wing fabric assembly with a TYVEK nonwoven fabric attached, as shown; and FIG. 19 shows the final attachment of the TYVEK nonwoven fabric over the folded cushion.

DESCRIPTION OF THE PREFERRED EMBODIMENT

Figure 1:
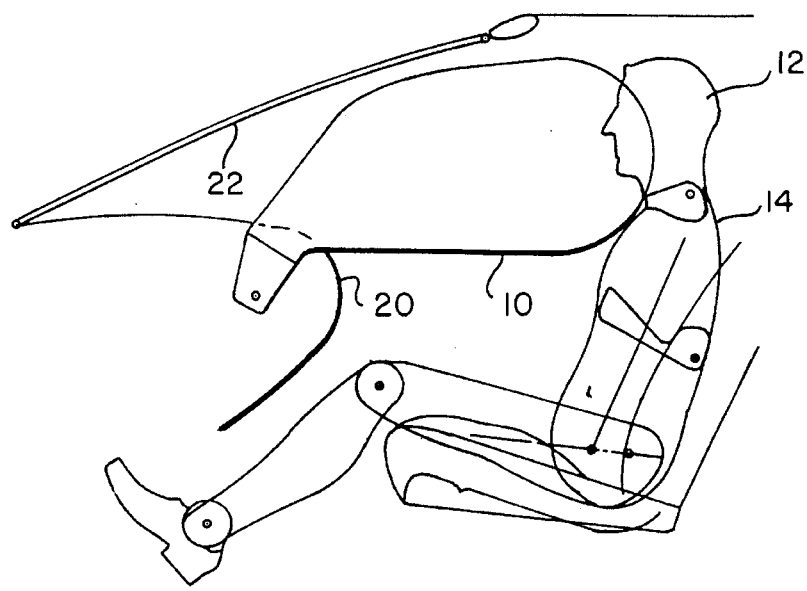
FIG. 1 is a schematic illustration portraying partial inflation of an air bag cushion which has been folded and stored in a manner known in the prior art to restrain a passenger in an automotive vehicle during a collision.

In inflatable air bag systems for restraining a passenger of a vehicle during a collision, a folded air bag cushion commonly is stored in a module mounted high on the dashboard of the vehicle. Upon the occurrence of a collision of the vehicle, the folded air bag cushion is inflated to restrain the passenger. Initiation of inflation of a folded air bag cushion 10 known in the prior art to restrain a passenger in a vehicle is illustrated in FIG. 1. As shown in FIG. 1, a pressurized fluid such as nitrogen gas produced by an inflator (not shown) is forced to flow into the mouth of the cushion to cause a portion of the cushion to deploy at great velocity initially toward the face 12 of a passenger 14 of the vehicle.

Figure 2:
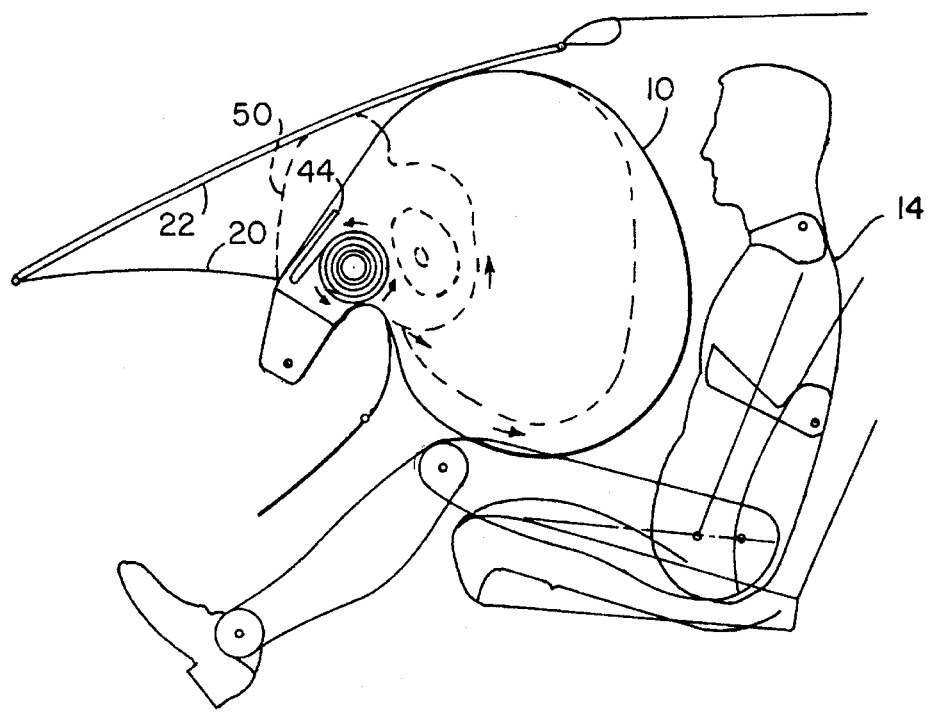
FIG. 2 is a depiction, in various stages of development, of an air bag cushion that had been folded and stored in the vehicle in accordance with the present invention and includes a depiction of the cushion at full bag deployment and pressure.

Initial deployment of a folded air bag cushion 10 having the same construction as the air bag cushion 10 shown in FIG. 1 is illustrated in FIG. 2. The air bag cushion 10 in FIG. 2, however, is folded in accordance with the present invention. As the pressurized nitrogen gas or other inflating fluid enters the air bag cushion 10 shown in FIG. 2, a portion of the cushion initially deploys toward the midsection of the passenger 14 in the vehicle. Initially, in FIG. 2, the inflating air bag cushion 10 does not deploy toward the face 12 of the passenger 14, as in the prior art arrangement illustrated in FIG. 1.

When in a fully inflated condition, the air bag cushions 10 of FIGS. 1 and 2 are positioned between the passenger and the dashboard 20 and windshield 22 of the vehicle and restrain movement of the passenger 14 during sudden deceleration of the vehicle.

The air bag cushion 10 illustrated in FIGS. 3 and 4 is lying flat prior to folding. As shown, the air bag cushion 10 includes a generally rectangular attachment or retainer 26 that defines the inflating gas inlet opening or mouth 24 of the cushion 10. The retainer 26 is suitably attached to a crimped diffuser assembly 28 of an air bag module extruded reaction canister 30 that connects the air bag cushion 10 to the dashboard of the vehicle. The top side of the air bag cushion 10 must mate with the top side of the extruded canister. All dimensions shown on the drawings are located from the top of the crimped diffuser cushion assembly 28.

The air bag cushion fold according to the invention is illustrated in FIGS. 3 through 19 of the drawings and comprises Steps 1 through 8, as described hereinafter.

Step 1: This step shows the initial setup of the air bag cushion 10. The cushion 10 is stretched, as shown in FIG. 3, with the bottom 32 of the cushion 10 facing up. The panel center 34 of the cushion is tucked toward the cushion mouth 24. This creates an upper pleat 36 and a lower pleat 38, as shown in FIG. 4.

Step 2: This step shows an initial roll comprising a fold of the upper pleat 36 and lower pleat 38 together. Holding 20 millimeters of the upper pleat 36 and the lower pleat 38 against the lower pleat 38, fold over 50 millimeters of the upper pleat 36 and the lower pleat 38 against the upper pleat 36, as shown in FIGS. 5 and 6.

Step 3: This step shows the continued folding of a plurality of folds of the air bag cushion 10 toward the mouth 24 of the cushion 10 to a predetermined length. Specifically, continue folding 50 millimeter folds until a predetermined bag length of about 350 millimeters is reached, as shown in FIGS. 7 and 8. This succession of 50 millimeter folds effects a reduction in the length of the cushion of about 40%. Stopping the roll at a predetermined extended length will create an initial deployment gas-fill cavity. If the cavity is too small the air bag cushion 10 can overpressurize early in the deployment (before 20 ms). The predetermined extended length also helps reduce bag slap due to the excess energy needed to unroll the rolled fabric. Upon deployment, the air bag cushion 10 will extend to the predetermined length. Then it will take additional energy to unroll the remainder of the cushion 10, which slows the deployment.

Step 4: Fold side wing panel 40 on top of the upper pleat 36, as shown in FIGS. 9, 10, 11 and 12.

Figure 13:
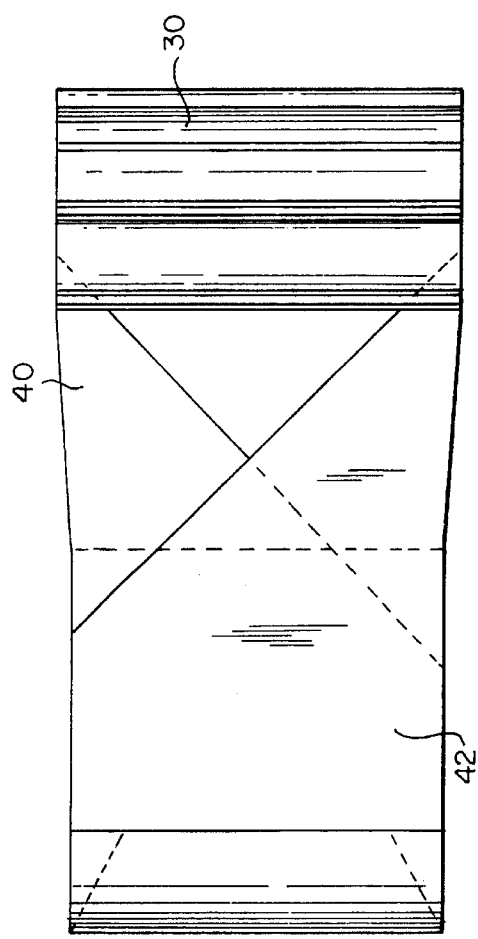
Figure 14:
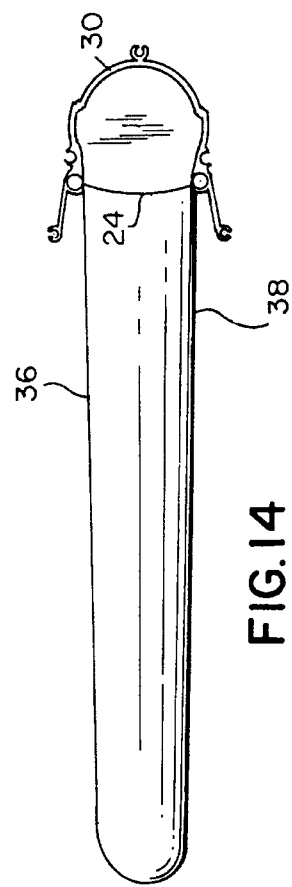

Step 5: Repeat Step 4 with the opposite side wing panel 42, as shown in FIGS. 13, 14 and 15. Steps 4 and 5 show the side wings 40 and 42 of the cushion 10 folded on toward the bottom side of the cushion 10. By doing so, the wings will deploy low into a passenger's lap instead of into the passenger's face.

Figure 16:
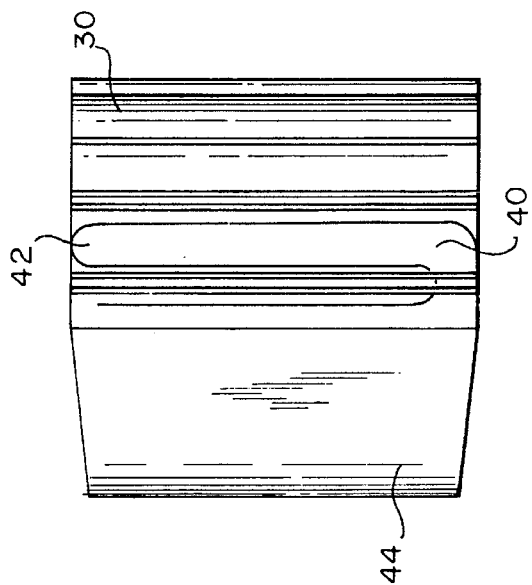
FIGS. 16 and 17 show the roll/wing panels inserted in the mouth of the cushion diffuser leaving a loop of excess cushion fabric protruding.
Figure 17:
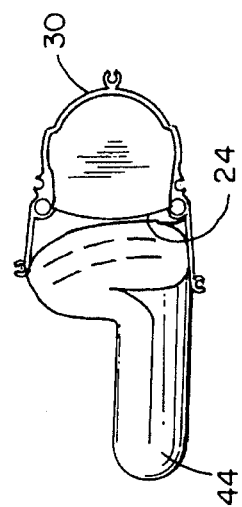

Step 6: This step shows the roll/wings 40 and 42 inserted into the mouth of the cushion diffuser assembly 28 of the canister 30 leaving a loop 44 of cushion fabric protruding therefrom. Specifically, as shown in FIGS. 16 and 17, respectively, insert the roll/wing panels 40 and 42 into the mouth of the cushion diffuser assembly 28 with the side wing panels 40 and 42 facing the diffuser assembly 28. This leaves a loop 44 of excess fabric protruding.

Step 7: This step shows the loop of fabric folded over the top of the roll/wing fabric assembly. Specifically, as shown in FIG. 18, fold the loop 44 of excess fabric over the cushion roll. Additionally, attach a TYVEK nonwoven fabric 46 to one side of the cushion retainer 26 and the diffuser 28 of the reaction canister 30.

Step 8: This step shows the final attachment of a cover 48 over the folded cushion 10. Specifically, the step involves attachment of the TYVEK nonwoven fabric 46 to the opposite side of the cushion retainer 26 and diffuser 28 of the reaction canister 30, as shown in FIG. 19.

Upon initiation of inflation of the air bag cushion 10 folded in accordance with the invention, the extension of the cushion 10 is momentarily stopped at the predetermined extended length. This creates a cavity within the loop 44 of excess fabric of the cushion 10, and also the folded side wing panels 40 and 42. Pressurization of the cavity results with expansion of the cushion 10 stopped at the predetermined length. With an air bag inflator of known performance, a cavity size can be determined at which pressurization thereof occurs at an appropriate time in the deployment, for example, 20 ms after initiation. If the cavity is too small the bag can overpressurize early in the deployment, that is, before 20 ms. The stopping of the cushion expansion helps reduce bag slap due to the excess energy needed to unfurl the folded fabric. That is to say, upon deployment, the bag initially will extend to the predetermined extended length. Additional energy is then needed to unfurl the remainder of the cushion. This slows the deployment.

Thus, upon inflation of the air bag cushion 10, a bubble 50 of fabric first opens against the windshield 22, as shown in FIG. 2, and causes the rest of the cushion to be pushed down. Cushion fabric then unfolds downward against the dashboard. This involves deploying rearward and downward the side wing panels 40 and 42 that folded from the opposite sides of the cushion 10. With the side wing panels 40 and 42 folded toward the bottom of the cushion 10, the side wing panels 40 and 42, when inflated, deploy low into a passenger's lap instead of the passenger's face.

Since the cushion 10 has a number of different types of folds which can only unfold in sequence one after another, the cushion deploys relatively slowly in a downward trajectory, with initial deployment being against the midsection of the passenger 14. The velocity of cushion deployment is reduced because the cushion cannot unfold faster than the inflator employed can fill it with inflating fluid.

With this description of the invention in detail, those skilled in the art will appreciate that modifications may be made to the invention without departing from the spirit thereof. Therefore, it is not intended that the scope of the invention be limited to the specific embodiment that has been illustrated and described. Rather, it is intended that the scope of the invention be determined by the scope of the appended claims.

What is claimed is:

1. A method of folding an inflatable air bag cushion made of air bag fabric and having a mouth defined by a cushion diffuser of a reaction canister comprising the steps, with the cushion initially unfolded and uninflated and positioned with the bottom facing up and the mouth at a central side position thereof:

a. tucking the center of the cushion toward the mouth to create an upper pleat and a lower pleat;

b. initially holding about 20 millimeters of the lower and upper pleats, folding a succession of folds, each of which is about 50 millimeters long, into a roll over the upper pleat until a predetermined extended air bag length of about 60% of the original length thereof is reached;

c. folding one side wing panel of the cushion fabric on top of the upper pleat, and therefore, toward the bottom of the cushion;

d. folding the opposite side wing panel of the cushion fabric on top of the folded said one side wing panel thereof and therefore also toward the bottom of the cushion, the width of the folded cushion being about the width of the mouth of the cushion;

e. inserting the roll of and folded side wing panel fabric of cushion into the mouth of the cushion diffuser with the fabric of the folded side wing panels facing the cushion diffuser and with a loop of excess cushion fabric protruding; and f. folding the loop of excess fabric over the fabric of the roll and folded side wing panels of the cushion.

2. A method as defined by claim 1 followed by an additional step, as follows:

g. attaching a TYVEK nonwoven fabric to the reaction canister to retain the loop of excess fabric and the fabric of the roll of folded cushion side wing panels inserted in the mouth of the cushion diffuser.

3. An inflatable folded air bag cushion for restraining a vehicle occupant, said air bag cushion being top mounted on the vehicle dashboard and using several fold variations comprising a loop of folded cushion fabric, folded side wing panels, a roll comprising a plurality of folds that reduce the extended length of the air bag by about 40%, and a pleat producing tuck which inversely move down the dashboard of the vehicle and which can only unfold in sequence one after another when an inflating fluid flows into the cushion, said air bag cushion being made of air bag fabric and having a mouth defined by a cushion diffuser of a reaction canister, said air bag cushion having a top and a bottom and an initially unfolded and uninflated condition, said air bag cushion when in said initially unfolded and uninflated condition being positioned with the bottom facing up and the mouth at a central side position thereof, folding of said air bag cushion being effected by a succession one after the other of a tuck, a roll and folds comprising, the center of the fabric being tucked toward the mouth of the air bag cushion to create an upper pleat and a lower pleat, with about 20 millimeters of the lower and upper pleats being held in a region distal from the cushion mouth, a fold of about 50 millimeters being folded over the upper pleat and a plurality of such folds of about 50 millimeters each over the upper pleat into a roll being continued until a predetermined extended air bag length of about 60% of the original length thereof is reached, one side wing panel of the cushion being folded on top of the upper pleat, the opposite side wing panel of the cushion being folded on top of the folded said one side wing panel thereof, the width of the folded cushion being about the width of the mouth of the cushion, the roll and folded side wing panels of the cushion being inserted into the mouth of the cushion with the wing panels facing the cushion diffuser, with a loop of excess fabric of the cushion protruding, the loop of excess fabric being folded over the roll and folded side wing panels, and whereby upon initiation of inflation of the air bag cushion, expansion of the cushion is momentarily stopped at the predetermined extended length and an initial gas-fill cavity is produced in the cushion that controls the deployment of the cushion.

4. An inflatable folded air bag cushion, as defined in claim 3, further including a TYVEK nonwoven fabric attached to the cushion diffuser of the reaction canister to retain the loop of excess fabric and the fabric-of the roll of folded cushion side wing panels inserted in the mouth of the cushion diffuser.

5. An inflatable folded air bag cushion, as defined in claim 3, wherein upon initiation of inflation of said air bag cushion, said initial gas-fill cavity is produced in said loop of excess fabric and said folded side wing panels.

6. An inflatable folded air bag cushion, as defined in claim 5, wherein upon initiation of inflation of said air bag cushion said initial gas-fill cavity is overpressurized at a time in the deployment that is in accord with the cushion deployment desired and introduces a need for additional energy to unfurl the remaining cushion, which slows the deployment.

7. An inflatable folded air bag cushion, as defined in claim 6, wherein said gas-fill cavity is of a size that cannot overpressurize early in the deployment, that is, before 20 ms.

8. An inflatable folded air bag cushion, as defined in claim 5, wherein, with the side wing panels folded on top of the upper pleat, and therefore, toward the bottom of the cushion, the side wing panels, when inflated, deploy low into the occupant's lap.

9. An inflatable folded air bag cushion, as defined by claim 3, wherein said air bag cushion when stretched out with the bottom of the cushion facing out, has a length of about 580 millimeters and a width of about 686 millimeters, and wherein a plurality of folds of the lower and upper pleats of about 50 millimeters each is continued until a predetermined extended air bag length of about 350 millimeters is reached.

10. An inflatable folded air bag cushion, as defined in claim 9, wherein, upon initiation of inflation of the air bag cushion, expansion of the cushion is momentarily stopped at the predetermined extended length and a gas-fill cavity is produced in said loop of excess fabric and said folded side wing panels, which gas-fill cavity is overpressurized at a time that is in accord with the control of the cushion deployment that is desired and introduces a need for additional energy to unfurl the remaining cushion, which slows the deployment.

11. An inflatable folded air bag cushion, as defined by claim 10, wherein said gas-fill cavity is of a size that cannot overpressurize early in the deployment, that is, before about 20 ms.

* * * * *